(12) United States Patent
Trika et al.

(10) Patent No.: US 12,430,024 B2
(45) Date of Patent: Sep. 30, 2025

(54) MULTIPLE TIER STORAGE DEPLOYMENT MANAGEMENT ENGINE

(71) Applicant: Intel Corporation, Santa Clara, CA (US)

(72) Inventors: Sanjeev Trika, Portland, OR (US); Kapil Karkra, Chandler, AZ (US); Mariusz Barczak, Gdansk (PL)

( * ) Notice: Subject to any disclaimer, the term of this patent is extended or adjusted under 35 U.S.C. 154(b) by 774 days.

(21) Appl. No.: 17/551,755

(22) Filed: Dec. 15, 2021

(65) Prior Publication Data

US 2022/0107733 A1 Apr. 7, 2022

(51) Int. Cl.
*G06F 3/06* (2006.01)
*G06F 11/30* (2006.01)

(52) U.S. Cl.
CPC .......... *G06F 3/0607* (2013.01); *G06F 3/0611* (2013.01); *G06F 3/0638* (2013.01); *G06F 3/0685* (2013.01); *G06F 11/3034* (2013.01)

(58) Field of Classification Search
CPC .... G06F 3/0607; G06F 3/0611; G06F 3/0638; G06F 3/0685; G06F 3/0629; G06F 11/3034; G06F 11/3051; G06F 11/3055; G06F 11/327; G06F 11/3466; G06F 3/06
See application file for complete search history.

(56) References Cited

U.S. PATENT DOCUMENTS

| | | | | |
|---|---|---|---|---|
| 9,983,795 | B1* | 5/2018 | Naamad | G06F 3/0629 |
| 10,915,497 | B1* | 2/2021 | Bono | G06F 16/185 |
| 11,487,568 | B2* | 11/2022 | Mahloo | G06F 11/3495 |
| 11,868,629 | B1* | 1/2024 | Singh | G06F 3/0632 |
| 2008/0301255 | A1* | 12/2008 | He | H04L 67/5682 709/214 |
| 2021/0048962 | A1 | 2/2021 | Karkra et al. | |
| 2023/0102863 | A1* | 3/2023 | Koropoff | G06F 3/0673 711/170 |

OTHER PUBLICATIONS

J.Guerra. "Cost Effective Storage using Extent Based Dynamic Tiering", 2011 (Year: 2011).*

* cited by examiner

*Primary Examiner* — Khoa D Doan
(74) *Attorney, Agent, or Firm* — Haley Guiliano LLP

(57) ABSTRACT

An embodiment of an electronic apparatus may comprise a processor, memory communicatively coupled to the processor, and circuitry communicatively coupled to the processor and the memory to determine a group of available types of persistent memory devices and a set of characteristics associated with each type of persistent memory device of the group of available types of persistent memory devices, determine of a set of requirements for a storage system, and determine a deployment configuration for the storage system with a lowest storage acquisition cost based on the group of available types of persistent memory devices, the sets of characteristics, and the set of requirements. Other embodiments are disclosed and claimed.

17 Claims, 7 Drawing Sheets

|  | MEM1 | MEM2 | MEM3 | MEM4 | MEM5 | MEM6 | MEM7 | MEM8 | MEM9 | MEM10 | Unit |
|---|---|---|---|---|---|---|---|---|---|---|---|
| Price | 0.015 | 0.02 | 0.08 | 0.092 | 0.104 | 0.64 | 0.6 | 1.8 | 3 | 30 | $/GB |
| RandWritePerf | 0.002 | 0.008 | 0.15 | 0.15 | 0.55 | 0.68 | 3.2 | 2.4 | 4.4 | 50 | GB/s |
| Endurance | 0.1 | 0.05 | 0.2 | 0.2 | 1 | 30 | 15 | 60 | 1250 | $2\times10^9$ | DWPD |
| DeviceSize | 10240 | 16384 | 15360 | 3840 | 3840 | 800 | 800 | 375 | 256 | 16 | GB |

FIG. 5A

| REQUIREMENT | UNIT | VALUE |
|---|---|---|
| BurstDuration | seconds | 7200 |
| Lifetime | years | 5 |
| FrontendRandomWritePerf | GBps | 5 |
| FrontendDataCapacityMultiplier | mult | 3 |
| BackendStorageCapacity | GB | 50000 |
| BackendCapacityMultiplier | mult | 1.375 |
| BackendRandomWriteSustainedPerf | mult | 0.1 |

|  | FRONT-END → | | | | | | | |
|---|---|---|---|---|---|---|---|---|
|  |  | MEM1 | MEM2 | MEM3 | MEM4 | MEM5 | MEM6 | ... | MEMn |
| BACK-END ↓ | MEM1 | | | | | | | | |
|  | MEM2 | | | | | | | | |
|  | MEM3 | | | | | | | | |
|  | MEM4 | | | | | | | | |
|  | MEM5 | | | | | | | | |
|  | . | | | | | | | | |
|  | MEMn | | | | | | | | |

|  | ... FRONT END → ... | | | | | |
|---|---|---|---|---|---|---|
|  |  | FLASH1 | FLASH2 | NAND1 | NAND2 | NVDIMM1 |
| BACK END ↓ | SSD1 | 17613 | 16666 | 17999 | 17510 | 16454 |
|  | SSD2 | 12575 | 10399 | 10504 | 10015 | 8959 |
|  | SSD3 | 9687 | 7511 | 7616 | 7127 | (6071) |

FIG. 6

MULTIPLE TIER STORAGE DEPLOYMENT MANAGEMENT ENGINE

BACKGROUND

A multi-tier storage system stores data in various types of storage devices based on a range of requirements for cost, availability, performance, recovery, etc. Different types of devices include solid-state drives (SSDs), hard-disk drives (HDDs), non-volatile dual-inline memory modules (NVDIMMs), etc. Different data classes may be assigned to different tiers in the storage system. Example tiered storage data classes include mission critical data that is generally stored at a higher tier to support high-speed access, hot data that is generally stored at a relatively high tier to support frequent access, warm data that may be stored at a relatively lower tier, and cold data that is generally stored at a lower tier. Data may be reclassified as the access frequency to the data changes over time.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIGS. 5A to 5C are illustrative diagrams of examples of data structures according to an embodiment;

FIG. 6 is an illustrative diagram of another example of a data structure according to an embodiment.

DETAILED DESCRIPTION

Figure 1:
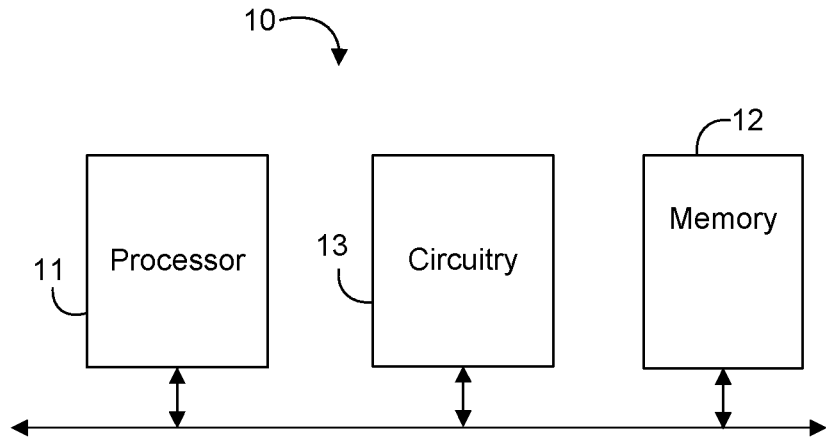
FIG. 1 is a block diagram of an example of an electronic apparatus according to an embodiment.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smartphones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, Field Programmable Gate Array (FPGA), firmware, driver, software, or any combination thereof. The material disclosed herein may also be implemented as instructions stored on a machine-readable medium, which may be read and executed by Moore Machine, Mealy Machine, and/or one or more processors. A machine-readable medium may include any medium and/or mechanism for storing or transmitting information in a form readable by a machine (e.g., a computing device). For example, a machine-readable medium may include read only memory (ROM); random access memory (RAM); Dynamic random-access memory (DRAM), magnetic disk storage media;

optical storage media; NV memory devices; phase-change memory, qubit solid-state quantum memory, electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Various embodiments described herein may include a memory component and/or an interface to a memory component. Such memory components may include volatile and/or nonvolatile (NV) memory. Volatile memory may be a storage medium that requires power to maintain the state of data stored by the medium. Non-limiting examples of volatile memory may include various types of random access memory (RAM), such as dynamic RAM (DRAM) or static RAM (SRAM). One particular type of DRAM that may be used in a memory module is synchronous dynamic RAM (SDRAM). In particular embodiments, DRAM of a memory component may comply with a standard promulgated by Joint Electron Device Engineering Council (JEDEC), such as JESD79F for double data rate (DDR) SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at jedec.org). Such standards (and similar standards) may be referred to as DDR-based standards and communication interfaces of the storage devices that implement such standards may be referred to as DDR-based interfaces.

NV memory (NVM) may be a storage medium that does not require power to maintain the state of data stored by the medium. In one embodiment, the memory device may include a three dimensional (3D) crosspoint memory device, or other byte addressable write-in-place nonvolatile memory devices. In one embodiment, the memory device may be or may include memory devices that use chalcogenide glass, single or multi-level Phase Change Memory (PCM), a resistive memory, nanowire memory, ferroelectric transistor RAM (FeTRAM), anti-ferroelectric memory, magnetoresistive RAM (MRAM) memory that incorporates memristor technology, resistive memory including the metal oxide base, the oxygen vacancy base and the conductive bridge RAM (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product. In particular embodiments, a memory component with non-volatile memory may comply with one or more standards promulgated by the JEDEC, or other suitable standard (the JEDEC standards cited herein are available at jedec.org).

A user may operate a storage system with hard-disk drives (HDDs), solid-state drives (SSDs), non-volatile dual-inline memory modules (NVDIMMSs), etc., that may utilize different types of media (e.g., magnetic media, NAND, 3D NAND-based media, 3D crosspoint-based media, etc.) and different costs associated with the different types of media. Even with the same type of media, different types of memory/storage devices may have different characteristics or prices associated with the different devices. A multi-tier storage system may include different types of devices in each tier. In some storage systems, for example, faster and lower capacity devices may be utilized to cache slower and higher capacity devices. Choosing among a multitude of different types of devices for each tier, however, may be challenging and the media type selection and the configuration of the devices (e.g., including quantities) may not result in a cost-optimized, performance-optimized, or endurance-optimized solution for a user's workload. Even with an extensive upfront workload analysis to determine an appropriate mix of devices and usage policies, there is a problem because the analysis is static. A storage system may be deployed for several years, and the workload, device selection and price changes over time are not accounted for in the initial media type selection and device configuration. Some embodiments overcome one or more of the foregoing problems.

With reference to FIG. 1, an embodiment of an electronic apparatus 10 may include a processor 11, memory 12 communicatively coupled to the processor 11, and a circuitry 13 communicatively coupled to the processor 11 and the memory 12. The circuitry 13 may be configured to determine a group of available types of persistent memory devices and a set of characteristics associated with each type of persistent memory device of the group of available types of persistent memory devices, determine of a set of requirements for a storage system, and determine a deployment configuration for the storage system with a lowest storage acquisition cost based on the group of available types of persistent memory devices, the sets of characteristics, and the set of requirements. In some embodiments, the circuitry 13 may be configured to determine respective storage acquisition costs for each combination of types of persistent memory devices for the group of available types of persistent memory devices, where each combination includes a first type utilized for a front-end tier of the storage system and a second type utilized for a back-end tier of the storage system. The circuitry 13 may also be configured to report the deployment configuration for the storage system that includes a combination of types of persistent memory devices with a lowest determined storage acquisition cost, where the reported deployment configuration includes a first recommended quantity of a first type of the combination for the front-end tier of the storage system and a second recommended quantity for a second type of the combination for the back-end tier of the storage system. In some embodiments, the circuitry 13 may be further configured to determine one or more of a type of an available persistent memory device for the group of available types of persistent memory devices, a characteristic associated with the type of the available persistent memory device, and the set of requirements based on an input from a user.

In some embodiments, the circuitry 13 may be further configured to determine one or more deployed persistent memory devices at runtime, collect runtime information for the one or more deployed persistent memory devices, determine one or more types of available persistent memory devices for the group of available types of persistent memory devices based on the one or more deployed persistent memory devices, and determine one or more sets of characteristics respectively associated with the determined one or more types based on the collected runtime information for the one or more deployed persistent memory devices. The circuitry 13 may also be configured to determine an updated deployment configuration for the storage system with an updated lowest storage acquisition cost based on the group of available types of persistent memory devices that includes the determined one or more types, the sets of characteristics that includes the one or more sets of characteristics based on the collected runtime information for the one or more deployed persistent memory devices, and the set of requirements. In some embodiments, the circuitry 13 may be configured to generate an alert based on a variation between the set of requirements and the sets of characteristics that includes the one or more sets of characteristics based on the collected runtime information for the one or more deployed persistent memory devices, and report the alert together with the updated deployment configuration for the storage system.

For example, the processor 11, memory 12, and circuitry 13 may be configured as a storage management engine, a storage acquisition cost (SAC) analysis engine, and/or a SAC/total cost of ownership (TCO) analysis engine, as described in further detail herein. Embodiments of each of the above processor 11, memory 12, circuitry 13, and other apparatus components may be implemented in hardware, software, or any suitable combination thereof. For example, hardware implementations may include configurable logic, fixed-functionality logic, or any combination thereof. Examples of configurable logic include suitably configured programmable logic arrays (PLAs), FPGAs, complex programmable logic devices (CPLDs), and general purpose microprocessors. Examples of fixed-functionality logic include suitably configured application specific integrated circuits (ASICs), combinational logic circuits, and sequential logic circuits. The configurable or fixed-functionality logic can be implemented with complementary metal oxide semiconductor (CMOS) logic circuits, transistor-transistor logic (TTL) logic circuits, or other circuits Embodiments of the processor 11 may include a general purpose processor, a special purpose processor, a central processor unit (CPU), an execution unit, a general purpose controller, a special purpose controller, a memory controller, a storage controller, a microcontroller, an execution unit, etc. In some embodiments, the memory 12, the circuitry 13, and/or other apparatus memory may be located in, or co-located with, various components, including the processor 11 (e.g., on a same die).

Alternatively, or additionally, all or portions of these components may be implemented in one or more modules as a set of logic instructions stored in a machine- or computer-readable storage medium such as RAM, ROM, programmable ROM (PROM), firmware, etc., to be executed by a processor or computing device. For example, computer program code to carry out the operations of the components may be written in any combination of one or more operating system (OS) applicable/appropriate programming languages, including an object-oriented programming language such as PYTHON, PERL, JAVA, SMALLTALK, C++, C#, VHDL, Verilog, System C or the like and conventional procedural programming languages, such as the "C" programming language or similar programming languages. For example, the memory 12, persistent storage media, or other system memory may store a set of instructions (e.g., which may be firmware instructions) which when executed by the processor 11 cause the apparatus 10 to implement one or more components, features, or aspects of the apparatus 10 (e.g., determining the group of available types of persistent memory devices, the sets of characteristics associated with each type of persistent memory device, the set of requirements for the storage system, the lowest storage acquisition cost, the deployment configuration for the storage system, etc.).

Figure 2A:
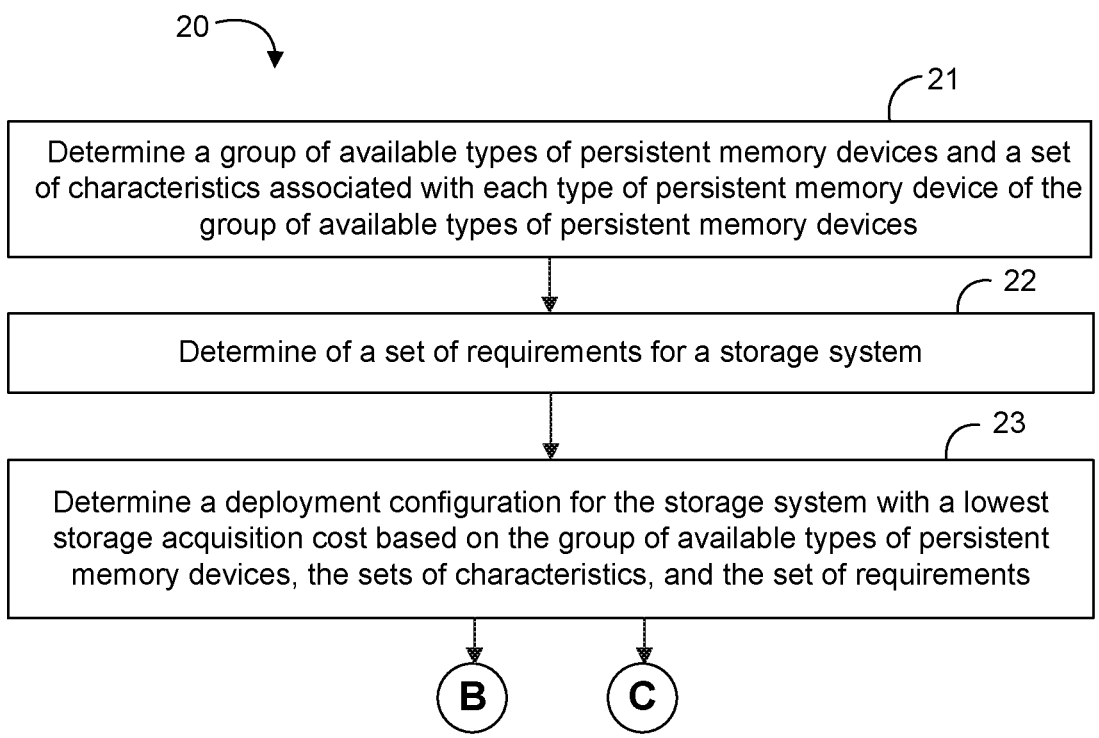
FIGS. 2A to 2C are a flowchart of an example of a method of managing storage according to an embodiment.
Figure 2B:
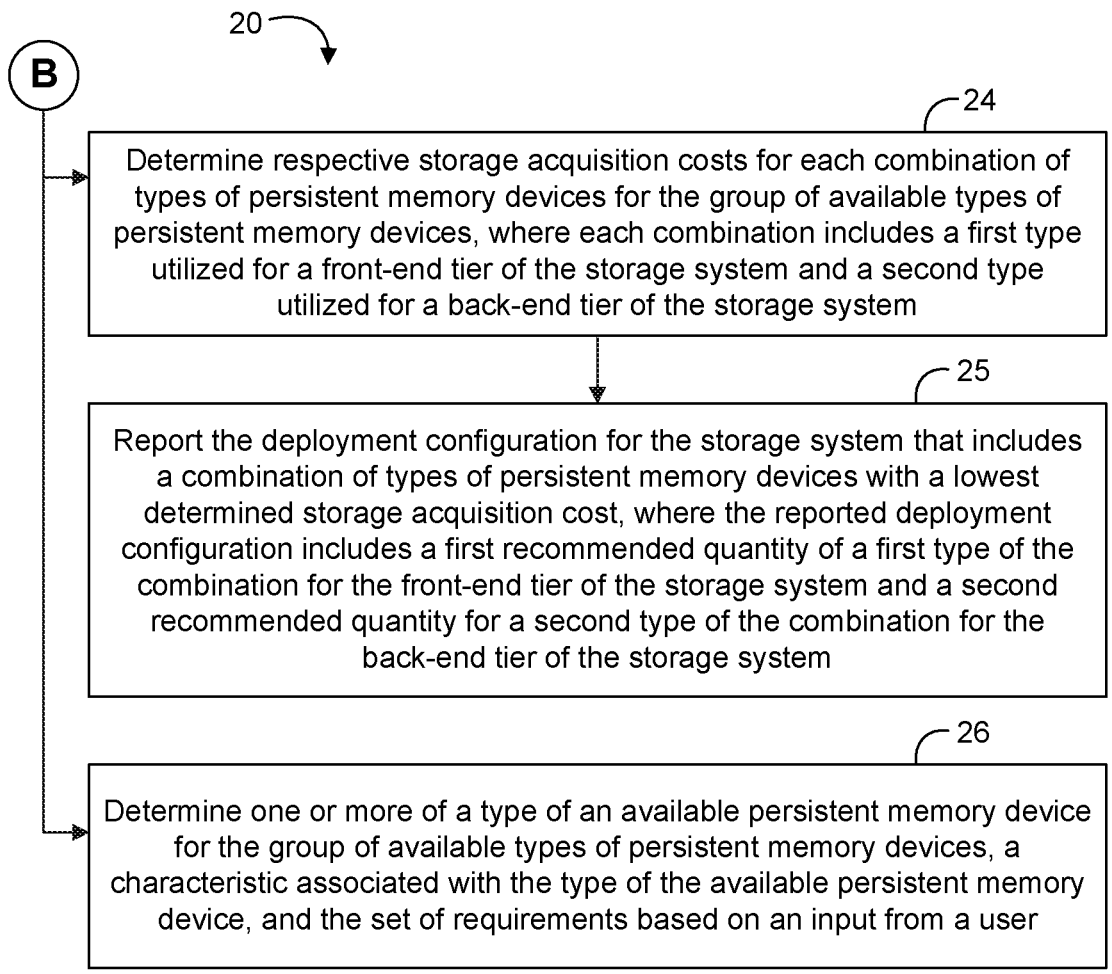
Figure 2C:
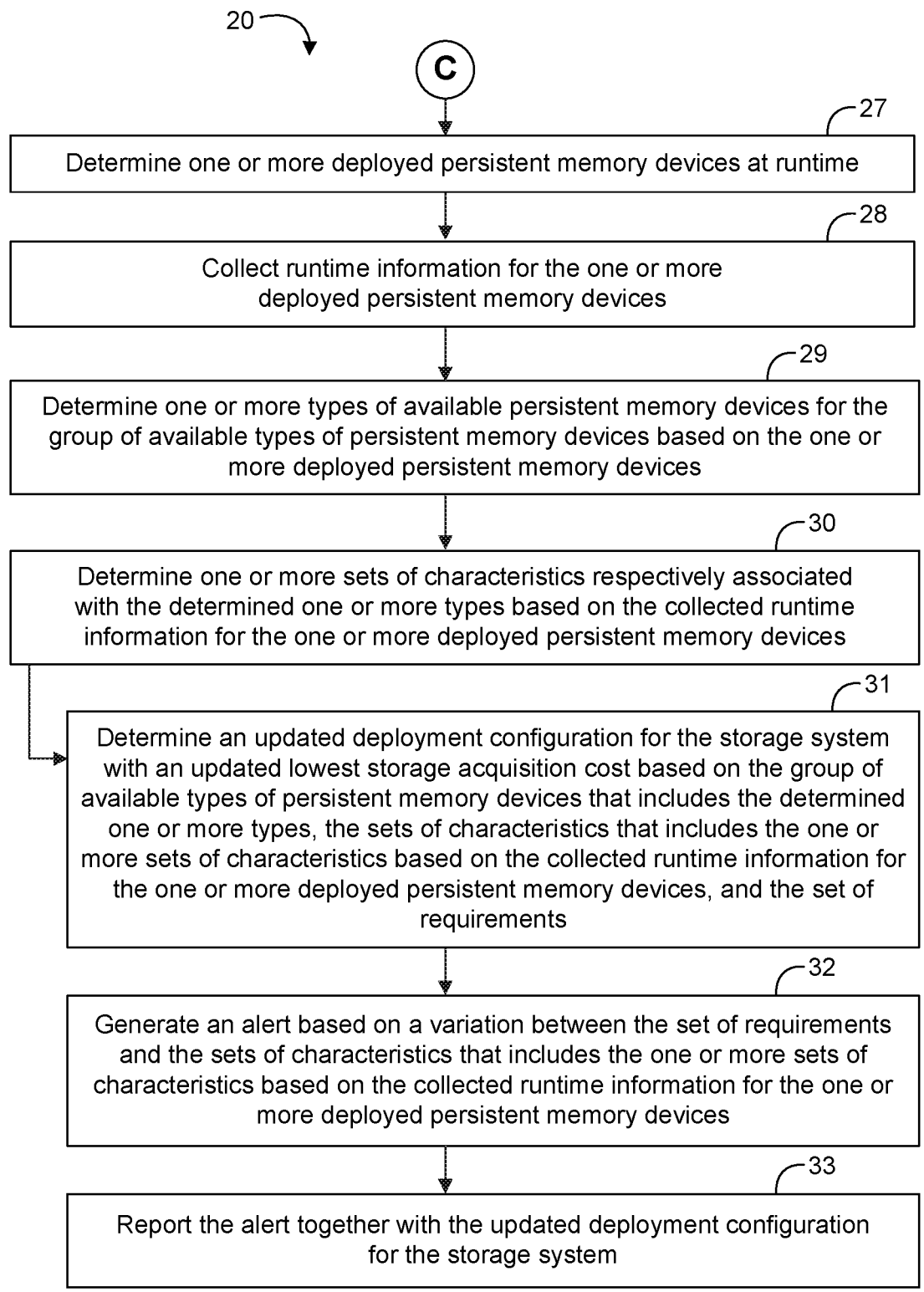

Turning now to FIGS. 2A to 2C, an embodiment of a method 20 of managing storage may include determining a group of available types of persistent memory devices and a set of characteristics associated with each type of persistent memory device of the group of available types of persistent memory devices at block 21, determining of a set of requirements for a storage system at block 22, and determining a deployment configuration for the storage system with a lowest storage acquisition cost based on the group of available types of persistent memory devices, the sets of characteristics, and the set of requirements at block 23. Some embodiments of the method 20 may further include determining respective storage acquisition costs for each combination of types of persistent memory devices for the group of available types of persistent memory devices, where each combination includes a first type utilized for a front-end tier of the storage system and a second type utilized for a back-end tier of the storage system at block 24, and reporting the deployment configuration for the storage system that includes a combination of types of persistent memory devices with a lowest determined storage acquisition cost, where the reported deployment configuration includes a first recommended quantity of a first type of the combination for the front-end tier of the storage system and a second recommended quantity for a second type of the combination for the back-end tier of the storage system at block 25. The method 20 may also include determining one or more of a type of an available persistent memory device for the group of available types of persistent memory devices, a characteristic associated with the type of the available persistent memory device, and the set of requirements based on an input from a user at block 26.

In some embodiments, the method 20 may further include determining one or more deployed persistent memory devices at runtime at block 27, collecting runtime information for the one or more deployed persistent memory devices at block 28, determining one or more types of available persistent memory devices for the group of available types of persistent memory devices based on the one or more deployed persistent memory devices at block 29, and determining one or more sets of characteristics respectively associated with the determined one or more types based on the collected runtime information for the one or more deployed persistent memory devices at block 30. The method 20 may also include determining an updated deployment configuration for the storage system with an updated lowest storage acquisition cost based on the group of available types of persistent memory devices that includes the determined one or more types, the sets of characteristics that includes the one or more sets of characteristics based on the collected runtime information for the one or more deployed persistent memory devices, and the set of requirements at block 31. Some embodiments of the method 20 may further include generating an alert based on a variation between the set of requirements and the sets of characteristics that includes the one or more sets of characteristics based on the collected runtime information for the one or more deployed persistent memory devices at block 32, and reporting the alert together with the updated deployment configuration for the storage system at block 33.

Embodiments of the method 20 may be implemented in a system, apparatus, computer, device, etc., for example, such as those described herein. More particularly, hardware implementations may include configurable logic (e.g., suitably configured PLAs, FPGAs, CPLDs, general purpose microprocessors, etc.), fixed-functionality logic (e.g., suitably configured ASICs, combinational logic circuits, sequential logic circuits, etc.), or any combination thereof. Hybrid hardware implementations include static dynamic System-on-Chip (SoC) re-configurable devices such that control flow, and data paths implement logic for the functionality. Alternatively, or additionally, the method 20 may be implemented in one or more modules as a set of logic instructions stored in a machine- or computer-readable storage medium such as RAM, ROM, PROM, firmware, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C#, VHDL, Verilog, System C or the like and conventional procedural programming languages, such as the "C" programming language or similar programming languages.

For example, the method 20 may be implemented on a computer readable medium. Embodiments or portions of the method 20 may be implemented in firmware, applications (e.g., through an application programming interface (API)), or driver software running on an OS. Additionally, logic instructions might include assembler instructions, instruction set architecture (ISA) instructions, data set architecture (DSA) commands, (machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, Moore Machine, Mealy Machine, etc.).

Figure 3:
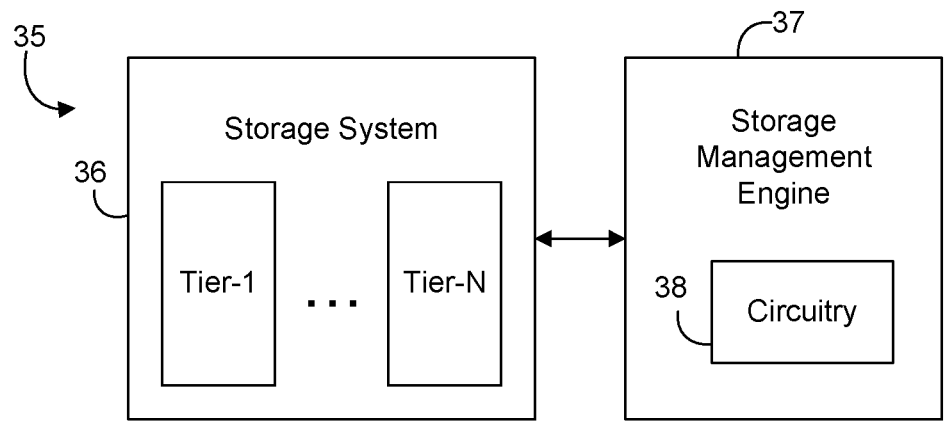
FIG. 3 is a block diagram of an example of an electronic system according to an embodiment.

With reference to FIG. 3, an embodiment of an electronic system 35 may include a storage system 36 with two or more types of deployed persistent memory devices organized as respective tiers (e.g., Tier-1 through Tier-N, where N>1), and a storage management engine 37 communicatively coupled to the storage system 36. The storage management engine may include circuitry 38 to determine a group of available types of persistent memory devices and a set of characteristics associated with each type of persistent memory device of the group of available types of persistent memory devices, determine of a set of requirements for the storage system, and determine a deployment configuration for the storage system with a lowest storage acquisition cost based on the group of available types of persistent memory devices, the sets of characteristics, and the set of requirements. In some embodiments, the circuitry 38 may be configured to determine respective storage acquisition costs for each combination of types of persistent memory devices for the group of available types of persistent memory devices, where each combination includes a first type utilized for a front-end tier of the storage system and a second type utilized for a back-end tier of the storage system, and to report the deployment configuration for the storage system that includes a combination of types of persistent memory devices with a lowest determined storage acquisition cost, where the reported deployment configuration includes a first recommended quantity of a first type of the combination for the front-end tier of the storage system and a second recommended quantity for a second type of the combination for the back-end tier of the storage system. The circuitry 38 may also be configured to determine one or more of a type of an available persistent memory device for the group of available types of persistent memory devices, a characteristic associated with the type of the available persistent memory device, and the set of requirements based on an input from a user.

In some embodiments, the circuitry 38 may be further configured to collect runtime information for persistent memory devices deployed in the storage system, include the two or more types of deployed persistent memory devices in the group of available types of persistent memory devices, and determine one or more sets of characteristics respectively associated with the included two or more types of deployed persistent memory devices based on the collected runtime information for the persistent memory devices deployed in the storage system. Some embodiments of the circuitry 38 may be further configured to determine an updated deployment configuration for the storage system with an updated lowest storage acquisition cost based on the group of available types of persistent memory devices that includes the determined one or more types, the sets of characteristics that includes the one or more sets of characteristics based on the collected runtime information for the one or more deployed persistent memory devices, and the set of requirements. The circuitry 38 may also be configured to generate an alert based on a variation between the set of requirements and the sets of characteristics that includes the one or more sets of characteristics based on the collected runtime information for the one or more deployed persistent memory devices, and to report the alert together with the updated deployment configuration for the storage system.

Embodiments of the circuitry 38 may be implemented in a system, apparatus, computer, device, etc., for example, such as those described herein. More particularly, hardware implementations may include configurable logic (e.g., suitably configured PLAs, FPGAs, CPLDs, general purpose microprocessors, etc.), fixed-functionality logic (e.g., suitably configured ASICs, combinational logic circuits, sequential logic circuits, etc.), or any combination thereof. Alternatively, or additionally, the circuitry 38 may be implemented in one or more modules as a set of logic instructions stored in a machine- or computer-readable storage medium such as RAM, ROM, PROM, firmware, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C#, VHDL, Verilog, System C or the like and conventional procedural programming languages, such as the "C" programming language or similar programming languages.

For example, the circuitry 38 may be implemented on a semiconductor apparatus, which may include one or more substrates, with the circuitry 38 coupled to the one or more substrates. In some embodiments, the circuitry 38 may be at least partly implemented in one or more of configurable logic and fixed-functionality hardware logic on semiconductor substrate(s) (e.g., silicon, sapphire, gallium-arsenide, etc.). For example, the circuitry 38 may include a transistor array and/or other integrated circuit components coupled to the substrate(s) with transistor channel regions that are positioned within the substrate(s). The interface between the circuitry 38 and the substrate(s) may not be an abrupt junction. The circuitry 38 may also be considered to include an epitaxial layer that is grown on an initial wafer of the substrate(s).

Some embodiments may advantageously provide technology for SAC and TCO optimization with runtime analysis and administrator assistance in a dynamic environment. Some embodiments provide technology for automatic and/or dynamic techniques to select media types for devices to be placed in a platform, and the configuration of the devices. Some embodiments include technology to provide recommendations on media types of devices to deploy in the platform, and recommendations for changes to devices deployed in the platform as a workload changes or if memory/storage devices with different characteristics become available.

Some embodiments may be incorporated in a software tool that enables users to determine a deployment configuration. Embodiments of the software tool may also be configured to evaluate a workload at runtime to suggest configuration changes. Example inputs to an embodiment of a suitably configured software tool include: 1) characteristics, including price, of available NVM devices; 2) known requirements with respect to performance, endurance, capacity and reliability; and 3) at runtime, measured workload characteristics in a closed feedback loop. The noted example inputs may be considered as dynamic inputs because the inputs change during deployment. An example output from an embodiment of a suitably configured software tool include a configuration recommendation that simultaneously meets all requirements (e.g., input #2) and minimizes the SAC. Some embodiments provide an initial deployment recommendation and also provide updated recommendations in a live dynamic system for system upgrades and continuous cost reduction. Some embodiments of a software tool may be configured to provide recommendations at a specified frequency at run-time, or on-demand Some embodiments may include further extensions (e.g., power and device failure-rate characteristics) to improve or optimize TCO.

Figure 4:
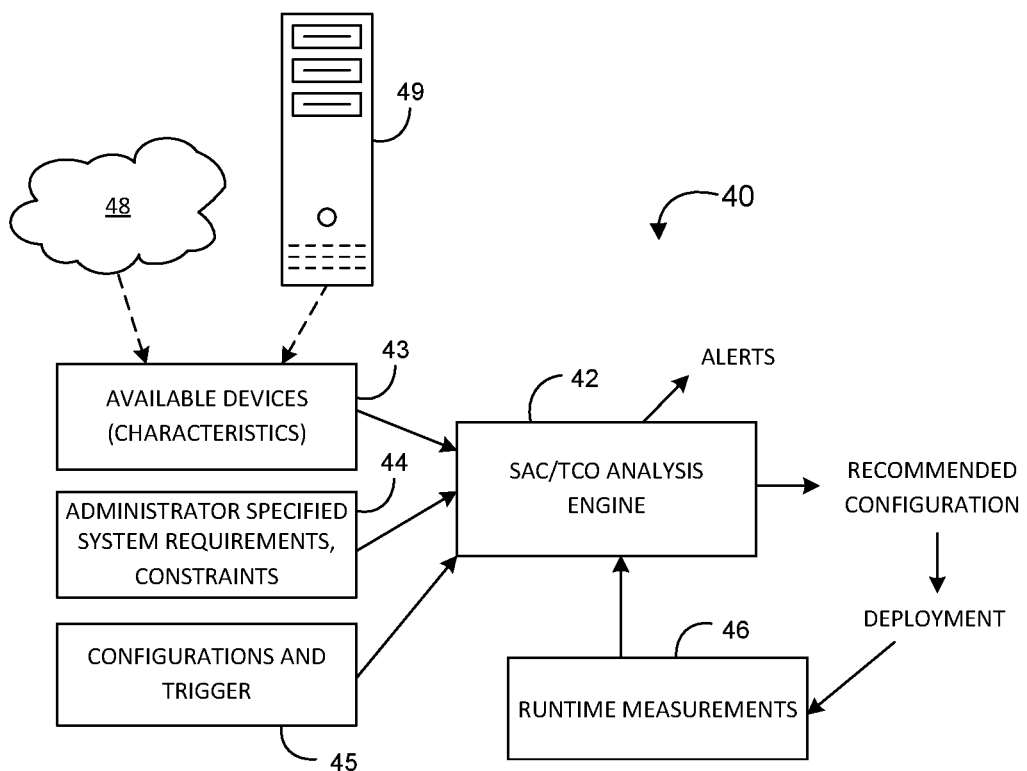
FIG. 4 is a block diagram of an example of a compute platform according to an embodiment.

With reference to FIG. 4, an embodiment of a compute platform 40 includes a SAC/TCO analysis engine 42 configured to provide recommended deployment configurations for the platform 40. Inputs to the SAC/TCO analysis engine 42 include available device information 43, administrator specified system requirement and constraint information 44, and configuration and trigger information 45. Embodiments of the SAC/TCO analysis engine 42 evaluate the various combinations of the device-types that can be deployed to simultaneously satisfy the administrator specified system constraints. The SAC/TCO analysis engine 42 then outputs a recommended configuration based on the evaluation. For example, the outputted recommended configuration may specify which of the available devices to deploy in what quantity, and in what configuration. A storage system may then be deployed (e.g., based on the recommended configuration), after which inputs to the SAC/TCO analysis engine 42 may further include runtime measurements 46.

In some embodiments, the available device information 43 may be pre-set and may be periodically updated. For example, the available device information 43 may be retrieved from an external source (e.g., a cloud service 48, a server 49, etc.). The available device information 43 may be updated as new types of media or new devices become available, or as prices change.

In some embodiments, the administrator specified system requirement and constraint information 44 indicates the desired minimum platform capabilities, that may include one or more of the storage capacity, performance (e.g., random and/or sequential, read and/or write, sustained and/or burst, etc.), burst duration, endurance, and reliability. Constraint information specified by the administrator may include information about the configuration (e.g., number of levels in the storage hierarchy) and how the layers are to be utilized. For example, constraint information may specify that the storage system includes two layers in the hierarchy, where the top layer is a read+write cache, and the second layer is a RAID5 volume. In another example, constraint information may specify that a front-end tier is used only as write-buffer to a back-end tier that is 8+3 erasure-coded.

In some embodiments, the configuration and trigger information 45 may indicate that the SAC/TCO analysis engine 42 is configured to provide an initial recommendation, and then provide an updated recommendation periodically (e.g., once a month), or to provide the updated recommendation on-demand Other configuration and trigger information 45 may indicate how administrator-specified requirements are considered in tandem with runtime measurements. If the runtime measurements show laxer requirements than the administrator specified requirements, for example, then configuration information may specify which of the two to use during evaluations performed by the SAC/TCO analysis engine 42. Other configuration and trigger information 45 may indicate alert frequency and/or alert thresholds.

In some embodiments, the runtime measurements 46 from a live deployment may include information about the actual devices deployed, telemetry information from the deployed devices, workload information (e.g., traces, statistics, etc.), and configuration statistics such as hit rates to various types of reads and writes. The runtime measurements 46 may be utilized by the SAC/TCO analysis engine 42 to better evaluate platform requirements as well as current capabilities, and to provide updates to the recommended configuration.

In some embodiments, alerts are generated by the SAC/TCO analysis engine 42 when a problem is identified or when an opportunity to further optimize the storage system is identified. For example, the SAC/TCO analysis engine 42 may detect a problem if the platform is getting more write requests over a long duration than indicated by the administrator-specified system requirements and the system capabilities. In response to a detected problem, the SAC/TCO analysis engine 42 generates the alert and may also indicate a new recommendation to the administrator. In another example, the SAC/TCO analysis engine 42 may detect underutilization of some devices and may alert the administrator of the opportunity to reduce the cost by removing a storage device.

Any suitable technology may be utilized to create and maintain the available device information, the administrator specified requirement and constraints information, the configuration and trigger information, the runtime measurements, and other information in one or more data structures that may be input to a SAC/TCO analysis engine. For example, such information may be input into and stored as a table, a database, etc. Some such information may be collected in an automated or semi-automated manner Some such information may be manually input by a user or an administrator.

FIG. 5A shows an embodiment of a data structure for available device information in the form of an available device table 52 with columns corresponding to n different types of memory/storage media (e.g., MEM1 through MEMn, where n>1) and rows corresponding to characteristics associated with each of the different types of memory/storage media. The table 52 is illustrative only and other available device data structures may include more or fewer types of media, and more, fewer, or different characteristics. In accordance with some embodiments, a SAC/TCO analysis engine may be configured to input multiple available device data structures having different formats from multiple sources. For example, different device vendors may create/maintain an available device data structure for the vendors' devices. The administrator may also create/maintain a local available device table, which in some embodiments may override or supersede device characteristic information from external sources. In some embodiments, a platform may include a software tool that provides a user interface for the administrator to manage internal and/or external available device information.

FIG. 5B shows an embodiment of a data structure for system requirement information in the form of storage node requirement table 54 with rows corresponding to different requirements and columns corresponding to units and values associated with each of the different requirements. The table 54 is illustrative only and other storage system requirement data structures may include more or fewer requirements, and more, fewer, or different fields associated with each requirement. In some embodiments, a platform may include a software tool that provides a user interface for the administrator to manage system requirement information (e.g., the user interface may also allow the administrator to manage constraint, configuration, and/or trigger information).

FIG. 5C shows an embodiment of a data structure for evaluation of combinations of different media types in the form of a decision matrix table 56 with columns corresponding to different types of media for a front-end tier of a storage system and rows corresponding to different types of media for a back-end tier of the storage system. Embodiments may evaluate each combination of the different types of media for the front-end and back-end tiers and store a determined storage acquisition cost in the appropriate entry in the table 56. Pseudo-code for an example technique of a SAC analysis engine is as follows:

```
For each (front-end, back-end) combination:
    CalculateCost (Requirements, front-end, back-end)
Tabulate Storage Acquisition Costs
```

In one example for an initial (non-runtime) analysis, an administrator specified configuration includes 2-layer media, in which the top layer is a triple-replicated write-buffer absorbing up to 2 hours of 5 GBps burst writes, and the bottom layer is an 8+3 erasure-coded 50 TB layer of 0.5 GBps sustained write-performance Other system requirements are captured in table 54 and include expected lifetime/endurance (5 years), for a specified random write performance (both burst and sustained, listed as front-end and back-end performance respectively). There are no read-performance requirements in this example.

In this example, the available-devices that an administrator may use are listed in the table 52 as columns. The representative characteristics in table 52 may correspond to various types of HDDs, SSDs with different performance/endurance characteristics, non-volatile dual-inline memory modules (NVDIMMs), etc. For each specific device, table 52 captures characteristics such as random write performance, performance per GByte, endurance in drive-writes-per-day (DWPD), etc.

For this example (for the administrator specific constraints), an embodiment of a SAC analysis engine uses the above pseudo-code to determine, for each combination of front-end and back-end media device types, the SAC to simultaneously meet the administrator specified requirements. The determined SACs are then tabulated in the table 56. The minimum entry in table 56 corresponds to the optimized SAC storage system that is provided by the SAC analysis engine as a recommended deployment configuration to the administrator. Similar techniques may be extended to support other configurations (e.g., if read-performance, power, or physical requirements are also specified, or if the SAC/TCO can be optimized via data classification and appropriate data placement, or if the use-case is tiering/caching rather than write-buffering, etc.), with a similar framework.

Embodiments of a SAC analysis engine consider that the front-end cost changes as the back-end capability changes. If the backend is more performant, for example, the front-end needs to buffer less. To address that, some embodiments loop through the count of back-end devices, ensures that the back-end meets minimum performance and endurance requirements, and then calculates the number of front-end devices required to support the back-end configuration. The resulting cost is computed and minimized over the loop.

With reference to FIG. 6, a partial decision matrix table 66 is filled in with representative SAC values for each combination of a different types of front-end devices and back-end devices. For the example illustrated in FIG. 6, the table 66 indicates that a NVDIMM1 front-end plus a SSD3 back-end device is the optimal storage-acquisition cost solution for the given set of platform requirements, constraints, and platform choices.

In some embodiments, configuration and statistics on a live deployment may be captured at run-time and the captured information may be provided to a SAC analysis engine. The SAC analysis engine may verify that the storage system is working as expected in terms of meeting performance, endurance, and other specified targets. The SAC analysis engine may also identify any anomalies and reports identified anomalies to the administrator via alerts and/or new recommendations.

Although the analysis in the foregoing example is described at a node level, those skilled in the art will appreciate that embodiments may be extended to rack levels, cluster levels, etc. In some embodiments, the administrator may provide the price as a constraint, and the SAC analysis engine may optimize for another free-variable indicated by the administrator. Rather than optimizing for SAC, for example, when operational costs (e.g., power consumption and energy costs per KWh, replacement costs+failure rates, physical footprint) are included in the inputs, the system may optimize for TCO (total cost of ownership). For example, embodiments may be used to input a max SAC/TCO which is the administrator's budget, set the SAC/TCO analysis engine to use the max SAC/TCO as a constraint, and be set to maximize on another criteria (e.g., such as life, read/write performance, etc.).

In some embodiments, the input requirements may include information about physical constraints per node (e.g., max 12 SSDs), form-factor constraints, and platform constraints (e.g., such as certain DIMMs may only be used in even quantities). The input requirements (e.g., and device characteristics) may also include information about power, quality of service (QoS), reliability and required features, all of which must be simultaneously satisfied when forming a recommendation. Some embodiments may also be extended to provide recommendations on other platform components (e.g., which network interface cards (NICs) to use), and processor/accelerator suggestions.

The technology discussed herein may be provided in various computing systems (e.g., including a non-mobile computing device such as a desktop, workstation, server, rack system, etc., a mobile computing device such as a smartphone, tablet, Ultra-Mobile Personal Computer (UMPC), laptop computer, ULTRABOOK computing device, smart watch, smart glasses, smart bracelet, etc., and/or a client/edge device such as an Internet-of-Things (IoT) device (e.g., a sensor, a camera, etc.)).

Figure 7:
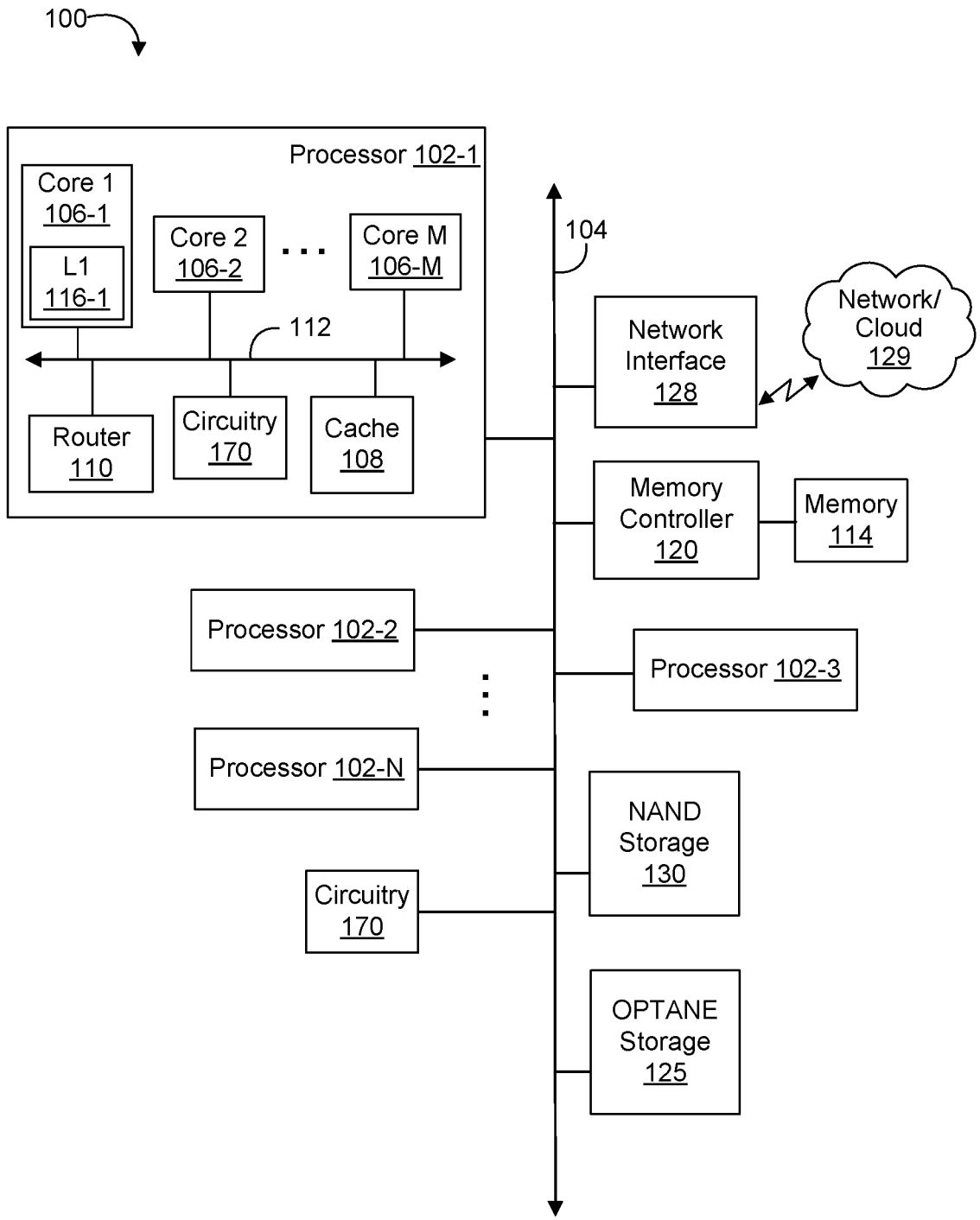
FIG. 7 is a block diagram of an example of a computing system according to an embodiment.

Turning now to FIG. 7, an embodiment of a computing system 100 may include one or more processors 102-1 through 102-N (generally referred to herein as "processors 102" or "processor 102"). The processors 102 may communicate via an interconnection or bus 104. Each processor 102 may include various components some of which are only discussed with reference to processor 102-1 for clarity. Accordingly, each of the remaining processors 102-2 through 102-N may include the same or similar components discussed with reference to the processor 102-1.

In some embodiments, the processor 102-1 may include one or more processor cores 106-1 through 106-M (referred to herein as "cores 106," or more generally as "core 106"), a cache 108 (which may be a shared cache or a private cache in various embodiments), and/or a router 110. The processor cores 106 may be implemented on a single integrated circuit (IC) chip. Moreover, the chip may include one or more shared and/or private caches (such as cache 108), buses or interconnections (such as a bus or interconnection 112), circuitry 170, memory controllers, or other components.

In some embodiments, the router 110 may be used to communicate between various components of the processor 102-1 and/or system 100. Moreover, the processor 102-1 may include more than one router 110. Furthermore, the multitude of routers 110 may be in communication to enable data routing between various components inside or outside of the processor 102-1.

The cache 108 may store data (e.g., including instructions) that is utilized by one or more components of the processor 102-1, such as the cores 106. For example, the cache 108 may locally cache data stored in a memory 114 for faster access by the components of the processor 102. As shown in FIG. 7, the memory 114 may be in communication with the processors 102 via the interconnection 104. In some embodiments, the cache 108 (that may be shared) may have various levels, for example, the cache 108 may be a mid-level cache and/or a last-level cache (LLC). Also, each of the cores 106 may include a level 1 (L1) cache (116-1) (generally referred to herein as "L1 cache 116"). Various components of the processor 102-1 may communicate with the cache 108 directly, through a bus (e.g., the bus 112), and/or a memory controller or hub.

As shown in FIG. 7, memory 114 may be coupled to other components of system 100 through a memory controller 120. Memory 114 may include volatile memory and may be interchangeably referred to as main memory or system memory. Even though the memory controller 120 is shown to be coupled between the interconnection 104 and the memory 114, the memory controller 120 may be located elsewhere in system 100. For example, memory controller 120 or portions of it may be provided within one of the processors 102 in some embodiments.

The system 100 may communicate with other devices/systems/networks via a network interface 128 (e.g., which is in communication with a computer network and/or the cloud 129 via a wired or wireless interface). For example, the network interface 128 may include an antenna (not shown) to wirelessly (e.g., via an Institute of Electrical and Electronics Engineers (IEEE) 802.11 interface (including IEEE 802.11a/b/g/n/ac, etc.), cellular interface, 3G, 4G, LTE, BLUETOOTH, etc.) communicate with the network/cloud 129.

System 100 may also include a first storage device such as NAND storage 130 coupled to the interconnect 104 via NAND controller logic, which may control access by various components of system 100 to the NAND storage 130. Furthermore, even though NAND storage 130 is shown to be directly coupled to the interconnection 104 in FIG. 7, the NAND controller logic can alternatively communicate via a storage bus/interconnect (such as the SATA (Serial Advanced Technology Attachment) bus, Peripheral Component Interconnect (PCI) (or PCI EXPRESS (PCIe) interface), NVM EXPRESS (NVMe), Serial Attached SCSI (SAS), Fiber Channel, etc.) with one or more other components of system 100 (for example where the storage bus is coupled to interconnect 104 via some other logic like a bus bridge, chipset, etc.) Additionally, the NAND controller logic may be incorporated into memory controller logic or provided on a same integrated circuit (IC) device with other components in various embodiments (e.g., on the same circuit board device as the NAND storage 130 or in the same enclosure as the NAND storage 130). For example, the NAND storage 130 may comprise a flash memory device, a SSD, etc.

Furthermore, the NAND controller logic and/or NAND storage 130 may be coupled to one or more sensors (not shown) to receive information (e.g., in the form of one or more bits or signals) to indicate the status of or values detected by the one or more sensors. These sensor(s) may be provided proximate to components of system 100 (or other computing systems discussed herein), including the cores 106, interconnections 104 or 112, components outside of the processor 102, NAND storage 130, SSD bus, SATA bus, circuitry 170, etc., to sense variations in various factors affecting power/thermal behavior of the system/platform, such as temperature, operating frequency, operating voltage, power consumption, and/or inter-core communication activity, etc.

System 100 may also include a second storage device such as OPTANE storage 125 coupled to the interconnect 104 via OPTANE controller logic, which may control access by various components of system 100 to the OPTANE storage 125. Furthermore, even though OPTANE storage 125 is shown to be directly coupled to the interconnection 104 in FIG. 7, the OPTANE controller logic can alternatively communicate via a memory bus interconnect (e.g., DDR) or a storage bus/interconnect (such as the SATA (Serial Advanced Technology Attachment) bus, Peripheral Component Interconnect (PCI) (or PCI EXPRESS (PCIe) interface), NVM EXPRESS (NVMe), Serial Attached SCSI (SAS), Fiber Channel, etc.) with one or more other components of system 100 (for example where the storage bus is coupled to interconnect 104 via some other logic like a bus bridge, chipset, etc.) Additionally, the OPTANE controller logic may be incorporated into memory controller logic or provided on a same integrated circuit (IC) device with other components in various embodiments (e.g., on the same circuit board device as the OPTANE storage 125 or in the same enclosure as the OPTANE storage 125). For example, the OPTANE storage 125 may comprise a persistent memory (PMEM) device, a dual inline memory module (DIMM), an OPTANE SSD, etc.

Furthermore, the OPTANE controller logic and/or OPTANE storage 125 may be coupled to one or more sensors (not shown) to receive information (e.g., in the form of one or more bits or signals) to indicate the status of or values detected by the one or more sensors. These sensor(s) may be provided proximate to components of system 100 (or other computing systems discussed herein), including the cores 106, interconnections 104 or 112, components outside of the processor 102, OPTANE storage 125, SSD bus, SATA bus, circuitry 170, etc., to sense variations in various factors affecting power/thermal behavior of the system/platform, such as temperature, operating frequency, operating voltage, power consumption, and/or inter-core communication activity, etc.

As illustrated in FIG. 7, the system 100 may include circuitry 170, which may be in the same enclosure as the processor(s) 102 and/or fully integrated on a printed circuit board (PCB) of the processor(s) 102. One or more of the features/aspects/operations discussed with reference to FIGS. 1-6 may be performed by one or more of the components of FIG. 7. Also, one or more of the features/aspects/operations of FIGS. 1-6 may be programmed into firmware. Advantageously, the circuitry 170 may include technology to implement one or more aspects of the apparatus 10 (FIG. 1), the method 20 (FIGS. 2A to 2B), the system 35 (FIG. 3), the compute platform 40 (FIG. 4), and/or any of the features discussed herein.

In particular, the circuitry 170 may be configured to provide a SAC/TCO analysis engine for the storage system (e.g., OPTANE storage 125 and the NAND storage 130). In some embodiments, the circuitry 170 may be configured to determine a group of available types of persistent memory devices and a set of characteristics associated with each type of persistent memory device of the group of available types of persistent memory devices, determine of a set of requirements for the storage system, and determine a deployment configuration for the storage system with a lowest storage acquisition cost based on the group of available types of persistent memory devices, the sets of characteristics, and the set of requirements. In some embodiments, the circuitry 170 may be configured to determine respective storage acquisition costs for each combination of types of persistent memory devices for the group of available types of persistent memory devices, where each combination includes a first type utilized for a front-end tier of the storage system (e.g., the OPTANE storage 125) and a second type utilized for a back-end tier of the storage system (e.g., the NAND storage 130), and to report the deployment configuration for the storage system that includes a combination of types of persistent memory devices with a lowest determined storage acquisition cost, where the reported deployment configuration includes a first recommended quantity of a first type of the combination for the front-end tier of the storage system and a second recommended quantity for a second type of the combination for the back-end tier of the storage system. The circuitry 170 may also be configured to determine one or more of a type of an available persistent memory device for the group of available types of persistent memory devices, a characteristic associated with the type of the available persistent memory device, and the set of requirements based on an input from a user.

In some embodiments, the circuitry 170 may be further configured to collect runtime information for persistent memory devices deployed in the storage system, include the two or more types of deployed persistent memory devices in the group of available types of persistent memory devices, and determine one or more sets of characteristics respectively associated with the included two or more types of deployed persistent memory devices based on the collected runtime information for the persistent memory devices deployed in the storage system. Some embodiments of the circuitry 170 may be further configured to determine an updated deployment configuration for the storage system with an updated lowest storage acquisition cost based on the group of available types of persistent memory devices that includes the determined one or more types, the sets of characteristics that includes the one or more sets of characteristics based on the collected runtime information for the one or more deployed persistent memory devices, and the set of requirements. The circuitry 170 may also be configured to generate an alert based on a variation between the set of requirements and the sets of characteristics that includes the one or more sets of characteristics based on the collected runtime information for the one or more deployed persistent memory devices, and to report the alert together with the updated deployment configuration for the storage system.

Embodiments of each of the circuitry 170, and other system components may be implemented in hardware, software, or any suitable combination thereof. For example, hardware implementations may include configurable logic such as, for example, PLAs, FPGAs, CPLDs, or fixed-functionality logic hardware using circuit technology such as, for example, ASIC, CMOS or TTL technology, or any combination thereof. In some embodiments, all or portions of the circuitry 170, and/or other system memory may be located in, or co-located with, various components, including the processor(s) 102 (e.g., on a same die, in a same enclosure, etc.).

Alternatively, or additionally, all or portions of these components may be implemented in one or more modules as a set of logic instructions stored in a machine- or computer-readable storage medium such as RAM), ROM, PROM, firmware, flash memory, etc., to be executed by the processor(s) 102. For example, computer program code to carry out the operations of the components may be written in any combination of one or more operating system (OS) applicable/appropriate programming languages, including an object-oriented programming language such as PYTHON, PERL, JAVA, SMALLTALK, C++, C#, VHDL, Verilog, System C or the like and conventional procedural programming languages, such as the "C" programming language or similar programming languages. For example, the memory 114, or other system memory may store a set of instructions which when executed by the processor(s) 102 cause the system 100 to implement one or more components, features, or aspects of the circuitry 170.

In other embodiments, the NAND storage 130 and/or the OPTANE storage may be replaced with any suitable storage/memory technology/media. In some embodiments, the circuitry 170 may be coupled to one or more substrates (e.g., silicon, sapphire, gallium arsenide, printed circuit board (PCB), etc.), and may include transistor channel regions that are positioned within the one or more substrates. The NAND storage 130 may alternatively, or additionally, include persistent volatile memory (e.g., battery or capacitor backed-up DRAM or SRAM). For example, the NAND storage 130 may include POWER LOSS IMMINENT (PLI) technology with energy storing capacitors. The energy storing capacitors may provide enough energy (power) to complete any commands in progress and to make sure that any data in the DRAMs/SRAMs is committed to the non-volatile NAND media. The capacitors may act as backup batteries for the persistent volatile memory. As shown in FIG. 7, features or aspects of the circuitry 170 may be distributed throughout the system 100, and/or co-located/integrated with various components of the system 100.

ADDITIONAL NOTES AND EXAMPLES

Example 1 includes an electronic apparatus, comprising a processor, memory communicatively coupled to the processor, and circuitry communicatively coupled to the processor and the memory to determine a group of available types of persistent memory devices and a set of characteristics associated with each type of persistent memory device of the group of available types of persistent memory devices, determine of a set of requirements for a storage system, and determine a deployment configuration for the storage system with a lowest storage acquisition cost based on the group of available types of persistent memory devices, the sets of characteristics, and the set of requirements.

Example 2 includes the apparatus of Example 1, wherein the circuitry is further to determine respective storage acquisition costs for each combination of types of persistent memory devices for the group of available types of persistent memory devices, wherein each combination includes a first type utilized for a front-end tier of the storage system and a second type utilized for a back-end tier of the storage system.

Example 3 includes the apparatus of Example 2, wherein the circuitry is further to report the deployment configuration for the storage system that includes a combination of types of persistent memory devices with a lowest determined storage acquisition cost, wherein the reported deployment configuration includes a first recommended quantity of a first type of the combination for the front-end tier of the storage system and a second recommended quantity for a second type of the combination for the back-end tier of the storage system.

Example 4 includes the apparatus of any of Examples 1 to 3, wherein the circuitry is further to determine one or more of a type of an available persistent memory device for the group of available types of persistent memory devices, a characteristic associated with the type of the available persistent memory device, and the set of requirements based on an input from a user.

Example 5 includes the apparatus of any of Examples 1 to 4, wherein the circuitry is further to determine one or more deployed persistent memory devices at runtime, collect runtime information for the one or more deployed persistent memory devices, determine one or more types of available persistent memory devices for the group of available types of persistent memory devices based on the one or more deployed persistent memory devices, and determine one or more sets of characteristics respectively associated with the determined one or more types based on the collected runtime information for the one or more deployed persistent memory devices.

Example 6 includes the apparatus of Example 5, wherein the circuitry is further to determine an updated deployment configuration for the storage system with an updated lowest storage acquisition cost based on the group of available types of persistent memory devices that includes the determined one or more types, the sets of characteristics that includes the one or more sets of characteristics based on the collected runtime information for the one or more deployed persistent memory devices, and the set of requirements.

Example 7 includes the apparatus of Example 6, wherein the circuitry is further to generate an alert based on a variation between the set of requirements and the sets of characteristics that includes the one or more sets of characteristics based on the collected runtime information for the one or more deployed persistent memory devices, and report the alert together with the updated deployment configuration for the storage system.

Example 8 includes a method of managing storage, comprising determining a group of available types of persistent memory devices and a set of characteristics associated with each type of persistent memory device of the group of available types of persistent memory devices, determining of a set of requirements for a storage system, and determining a deployment configuration for the storage system with a lowest storage acquisition cost based on the group of available types of persistent memory devices, the sets of characteristics, and the set of requirements.

Example 9 includes the method of Example 8, further comprising determining respective storage acquisition costs for each combination of types of persistent memory devices for the group of available types of persistent memory devices, wherein each combination includes a first type utilized for a front-end tier of the storage system and a second type utilized for a back-end tier of the storage system.

Example 10 includes the method of Example 9, further comprising reporting the deployment configuration for the storage system that includes a combination of types of persistent memory devices with a lowest determined storage acquisition cost, wherein the reported deployment configuration includes a first recommended quantity of a first type of the combination for the front-end tier of the storage system and a second recommended quantity for a second type of the combination for the back-end tier of the storage system.

Example 11 includes the method of any of Examples 8 to 10, further comprising determining one or more of a type of an available persistent memory device for the group of available types of persistent memory devices, a characteristic associated with the type of the available persistent memory device, and the set of requirements based on an input from a user.

Example 12 includes the method of any of Examples 8 to 11, further comprising determining one or more deployed persistent memory devices at runtime, collecting runtime information for the one or more deployed persistent memory devices, determining one or more types of available persistent memory devices for the group of available types of persistent memory devices based on the one or more deployed persistent memory devices, and determining one or more sets of characteristics respectively associated with the determined one or more types based on the collected runtime information for the one or more deployed persistent memory devices.

Example 13 includes the method of Example 12, further comprising determining an updated deployment configuration for the storage system with an updated lowest storage acquisition cost based on the group of available types of persistent memory devices that includes the determined one or more types, the sets of characteristics that includes the one or more sets of characteristics based on the collected runtime information for the one or more deployed persistent memory devices, and the set of requirements.

Example 14 includes the method of Example 13, further comprising generating an alert based on a variation between the set of requirements and the sets of characteristics that includes the one or more sets of characteristics based on the collected runtime information for the one or more deployed persistent memory devices.

Example 15 includes the method of Example 14, further comprising reporting the alert together with the updated deployment configuration for the storage system.

Example 16 includes an electronic system, comprising a storage system with two or more types of deployed persistent memory devices organized as respective tiers, and a storage management engine communicatively coupled to the storage system, the storage management engine including circuitry to determine a group of available types of persistent memory devices and a set of characteristics associated with each type of persistent memory device of the group of available types of persistent memory devices, determine of a set of requirements for the storage system, and determine a deployment configuration for the storage system with a lowest storage acquisition cost based on the group of available types of persistent memory devices, the sets of characteristics, and the set of requirements.

Example 17 includes the system of Example 16, wherein the circuitry is further to determine respective storage acquisition costs for each combination of types of persistent memory devices for the group of available types of persistent memory devices, wherein each combination includes a first type utilized for a front-end tier of the storage system and a second type utilized for a back-end tier of the storage system, and report the deployment configuration for the storage system that includes a combination of types of persistent memory devices with a lowest determined storage acquisition cost, wherein the reported deployment configuration includes a first recommended quantity of a first type of the combination for the front-end tier of the storage system and a second recommended quantity for a second type of the combination for the back-end tier of the storage system.

Example 18 includes the system of any of Examples 16 to 17, wherein the circuitry is further to determine one or more of a type of an available persistent memory device for the group of available types of persistent memory devices, a characteristic associated with the type of the available persistent memory device, and the set of requirements based on an input from a user.

Example 19 includes the system of any of Examples 16 to 18, wherein the circuitry is further to collect runtime information for persistent memory devices deployed in the storage system, include the two or more types of deployed persistent memory devices in the group of available types of persistent memory devices, and determine one or more sets of characteristics respectively associated with the included two or more types of deployed persistent memory devices based on the collected runtime information for the persistent memory devices deployed in the storage system.

Example 20 includes the system of Example 19, wherein the circuitry is further to determine an updated deployment configuration for the storage system with an updated lowest storage acquisition cost based on the group of available types of persistent memory devices that includes the determined one or more types, the sets of characteristics that includes the one or more sets of characteristics based on the collected runtime information for the one or more deployed persistent memory devices, and the set of requirements.

Example 21 includes the system of Example 20, wherein the circuitry is further to generate an alert based on a variation between the set of requirements and the sets of characteristics that includes the one or more sets of characteristics based on the collected runtime information for the one or more deployed persistent memory devices, and report the alert together with the updated deployment configuration for the storage system.

Example 22 includes at least one non-transitory machine readable medium comprising a plurality of instructions that, in response to being executed on a computing device, cause the computing device to determine a group of available types of persistent memory devices and a set of characteristics associated with each type of persistent memory device of the group of available types of persistent memory devices, determine of a set of requirements for a storage system, and determine a deployment configuration for the storage system with a lowest storage acquisition cost based on the group of available types of persistent memory devices, the sets of characteristics, and the set of requirements.

Example 23 includes the at least one non-transitory machine readable medium of Example 22, comprising a plurality of further instructions that, in response to being executed on the computing device, cause the computing device to determine respective storage acquisition costs for each combination of types of persistent memory devices for the group of available types of persistent memory devices, wherein each combination includes a first type utilized for a front-end tier of the storage system and a second type utilized for a back-end tier of the storage system.

Example 24 includes the at least one non-transitory machine readable medium of
Example 23, comprising a plurality of further instructions that, in response to being executed on the computing device, cause the computing device to report the deployment configuration for the storage system that includes a combination of types of persistent memory devices with a lowest determined storage acquisition cost, wherein the reported deployment configuration includes a first recommended quantity of a first type of the combination for the front-end tier of the storage system and a second recommended quantity for a second type of the combination for the back-end tier of the storage system.

Example 25 includes the at least one non-transitory machine readable medium of any of Examples 22 to 24, comprising a plurality of further instructions that, in response to being executed on the computing device, cause the computing device to determine one or more of a type of an available persistent memory device for the group of available types of persistent memory devices, a characteristic associated with the type of the available persistent memory device, and the set of requirements based on an input from a user.

Example 26 includes the at least one non-transitory machine readable medium of any of Examples 22 to 25, comprising a plurality of further instructions that, in response to being executed on the computing device, cause the computing device to determine one or more deployed persistent memory devices at runtime, collect runtime information for the one or more deployed persistent memory devices, determine one or more types of available persistent memory devices for the group of available types of persistent memory devices based on the one or more deployed persistent memory devices, and determine one or more sets of characteristics respectively associated with the determined one or more types based on the collected runtime information for the one or more deployed persistent memory devices.

Example 27 includes the at least one non-transitory machine readable medium of Example 26, comprising a plurality of further instructions that, in response to being executed on the computing device, cause the computing device to determine an updated deployment configuration for the storage system with an updated lowest storage acquisition cost based on the group of available types of persistent memory devices that includes the determined one or more types, the sets of characteristics that includes the one or more sets of characteristics based on the collected runtime information for the one or more deployed persistent memory devices, and the set of requirements.

Example 28 includes the at least one non-transitory machine readable medium of
Example 27, comprising a plurality of further instructions that, in response to being executed on the computing device, cause the computing device to generate an alert based on a variation between the set of requirements and the sets of characteristics that includes the one or more sets of characteristics based on the collected runtime information for the one or more deployed persistent memory devices.

Example 29 includes the at least one non-transitory machine readable medium of Example 28, comprising a plurality of further instructions that, in response to being executed on the computing device, cause the computing device to report the alert together with the updated deployment configuration for the storage system.

Example 30 includes a storage analysis engine, comprising means for determining a group of available types of persistent memory devices and a set of characteristics associated with each type of persistent memory device of the group of available types of persistent memory devices, means for determining of a set of requirements for a storage system, and means for determining a deployment configuration for the storage system with a lowest storage acquisition cost based on the group of available types of persistent memory devices, the sets of characteristics, and the set of requirements.

Example 31 includes the apparatus of Example 30, further comprising means for determining respective storage acquisition costs for each combination of types of persistent memory devices for the group of available types of persistent memory devices, wherein each combination includes a first type utilized for a front-end tier of the storage system and a second type utilized for a back-end tier of the storage system.

Example 32 includes the apparatus of Example 31, further comprising means for reporting the deployment configuration for the storage system that includes a combination of types of persistent memory devices with a lowest determined storage acquisition cost, wherein the reported deployment configuration includes a first recommended quantity of a first type of the combination for the front-end tier of the storage system and a second recommended quantity for a second type of the combination for the back-end tier of the storage system.

Example 33 includes the apparatus of any of Examples 30 to 32, further comprising means for determining one or more of a type of an available persistent memory device for the group of available types of persistent memory devices, a characteristic associated with the type of the available persistent memory device, and the set of requirements based on an input from a user.

Example 34 includes the apparatus of any of Examples 30 to 33, further comprising means for determining one or more deployed persistent memory devices at runtime, means for collecting runtime information for the one or more deployed persistent memory devices, determining one or more types of available persistent memory devices for the group of available types of persistent memory devices based on the one or more deployed persistent memory devices, and means for determining one or more sets of characteristics respectively associated with the determined one or more types based on the collected runtime information for the one or more deployed persistent memory devices.

Example 35 includes the apparatus of Example 34, further comprising means for determining an updated deployment configuration for the storage system with an updated lowest storage acquisition cost based on the group of available types of persistent memory devices that includes the determined one or more types, the sets of characteristics that includes the one or more sets of characteristics based on the collected runtime information for the one or more deployed persistent memory devices, and the set of requirements.

Example 36 includes the apparatus of Example 35, further comprising means for generating an alert based on a variation between the set of requirements and the sets of characteristics that includes the one or more sets of characteristics based on the collected runtime information for the one or more deployed persistent memory devices.

Example 37 includes the apparatus of Example 36, further comprising means for reporting the alert together with the updated deployment configuration for the storage system.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, and C" and the phrase "one or more of A, B, or C" both may mean A; B; C; A and B; A and C; B and C; or A, B and C. Various components of the systems described herein may be implemented in software, firmware, and/or hardware and/or any combination thereof. For example, various components of the systems or devices discussed herein may be provided, at least in part, by hardware of a computing SoC such as may be found in a computing system such as, for example, a smart phone. Those skilled in the art may recognize that systems described herein may include additional components that have not been depicted in the corresponding figures. For example, the systems discussed herein may include additional components such as bit stream multiplexer or de-multiplexer modules and the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the operations discussed herein and/or any portions the devices, systems, or any module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. An electronic apparatus, comprising:
   a processor;
   memory communicatively coupled to the processor; and
   circuitry communicatively coupled to the processor and the memory to:
      determine a group of available types of persistent memory devices and a set of characteristics associated with each type of persistent memory device of the group of available types of persistent memory devices,
      determine of a set of requirements for a storage system,
      determine a deployment configuration for the storage system with a lowest storage acquisition cost based on the group of available types of persistent memory devices, the sets of characteristics, and the set of requirements,
      determine one or more deployed persistent memory devices at runtime,
      collect runtime information for the one or more deployed persistent memory devices,
      determine one or more types of available persistent memory devices for the group of available types of persistent memory devices based on the one or more deployed persistent memory devices, and
      determine one or more sets of characteristics respectively associated with the determined one or more types based on the collected runtime information for the one or more deployed persistent memory devices.

2. The apparatus of claim 1, wherein the circuitry is further to:
   determine respective storage acquisition costs for each combination of types of persistent memory devices for the group of available types of persistent memory devices, wherein each combination includes a first type utilized for a front-end tier of the storage system and a second type utilized for a back-end tier of the storage system.

3. The apparatus of claim 2, wherein the circuitry is further to:
   report the deployment configuration for the storage system that includes a combination of types of persistent memory devices with a lowest determined storage acquisition cost, wherein the reported deployment configuration includes a first recommended quantity of a first type of the combination for the front-end tier of the storage system and a second recommended quantity for a second type of the combination for the back-end tier of the storage system.

4. The apparatus of claim 1, wherein the circuitry is further to:
   determine one or more of a type of an available persistent memory device for the group of available types of persistent memory devices, a characteristic associated with the type of the available persistent memory device, and the set of requirements based on an input from a user.

5. The apparatus of claim 1, wherein the circuitry is further to:
   determine an updated deployment configuration for the storage system with an updated lowest storage acquisition cost based on the group of available types of persistent memory devices that includes the determined one or more types, the sets of characteristics that includes the one or more sets of characteristics based on the collected runtime information for the one or more deployed persistent memory devices, and the set of requirements.

6. The apparatus of claim 5, wherein the circuitry is further to:
   generate an alert based on a variation between the set of requirements and the sets of characteristics that includes the one or more sets of characteristics based on the collected runtime information for the one or more deployed persistent memory devices; and
   report the alert together with the updated deployment configuration for the storage system.

7. A method of managing storage, comprising:
   determining a group of available types of persistent memory devices and a set of characteristics associated with each type of persistent memory device of the group of available types of persistent memory devices;
   determining of a set of requirements for a storage system;
   determining a deployment configuration for the storage system with a lowest storage acquisition cost based on the group of available types of persistent memory devices, the sets of characteristics, and the set of requirements;
   determining one or more deployed persistent memory devices at runtime;
   collecting runtime information for the one or more deployed persistent memory devices;
   determining one or more types of available persistent memory devices for the group of available types of persistent memory devices based on the one or more deployed persistent memory devices; and
   determining one or more sets of characteristics respectively associated with the determined one or more types based on the collected runtime information for the one or more deployed persistent memory devices.

8. The method of claim 7, further comprising:
determining respective storage acquisition costs for each combination of types of persistent memory devices for the group of available types of persistent memory devices, wherein each combination includes a first type utilized for a front-end tier of the storage system and a second type utilized for a back-end tier of the storage system.

9. The method of claim 8, further comprising:
reporting the deployment configuration for the storage system that includes a combination of types of persistent memory devices with a lowest determined storage acquisition cost, wherein the reported deployment configuration includes a first recommended quantity of a first type of the combination for the front-end tier of the storage system and a second recommended quantity for a second type of the combination for the back-end tier of the storage system.

10. The method of claim 7, further comprising:
determining one or more of a type of an available persistent memory device for the group of available types of persistent memory devices, a characteristic associated with the type of the available persistent memory device, and the set of requirements based on an input from a user.

11. The method of claim 7, further comprising:
determining an updated deployment configuration for the storage system with an updated lowest storage acquisition cost based on the group of available types of persistent memory devices that includes the determined one or more types, the sets of characteristics that includes the one or more sets of characteristics based on the collected runtime information for the one or more deployed persistent memory devices, and the set of requirements.

12. The method of claim 11, further comprising:
generating an alert based on a variation between the set of requirements and the sets of characteristics that includes the one or more sets of characteristics based on the collected runtime information for the one or more deployed persistent memory devices.

13. The method of claim 12, further comprising:
reporting the alert together with the updated deployment configuration for the storage system.

14. An electronic system, comprising:
a storage system with two or more types of deployed persistent memory devices organized as respective tiers; and
a storage management engine communicatively coupled to the storage system, the storage management engine including circuitry to:
determine a group of available types of persistent memory devices and a set of characteristics associated with each type of persistent memory device of the group of available types of persistent memory devices,
determine of a set of requirements for the storage system,
determine a deployment configuration for the storage system with a lowest storage acquisition cost based on the group of available types of persistent memory devices, the sets of characteristics, and the set of requirements,
collect runtime information for persistent memory devices deployed in the storage system,
include the two or more types of deployed persistent memory devices in the group of available types of persistent memory devices, and
determine one or more sets of characteristics respectively associated with the included two or more types of deployed persistent memory devices based on the collected runtime information for the persistent memory devices deployed in the storage system.

15. The system of claim 14, wherein the circuitry is further to:
determine respective storage acquisition costs for each combination of types of persistent memory devices for the group of available types of persistent memory devices, wherein each combination includes a first type utilized for a front-end tier of the storage system and a second type utilized for a back-end tier of the storage system; and
report the deployment configuration for the storage system that includes a combination of types of persistent memory devices with a lowest determined storage acquisition cost, wherein the reported deployment configuration includes a first recommended quantity of a first type of the combination for the front-end tier of the storage system and a second recommended quantity for a second type of the combination for the back-end tier of the storage system.

16. The system of claim 14, wherein the circuitry is further to:
determine one or more of a type of an available persistent memory device for the group of available types of persistent memory devices, a characteristic associated with the type of the available persistent memory device, and the set of requirements based on an input from a user.

17. The system of claim 14, wherein the circuitry is further to:
determine an updated deployment configuration for the storage system with an updated lowest storage acquisition cost based on the group of available types of persistent memory devices that includes the determined one or more types, the sets of characteristics that includes the one or more sets of characteristics based on the collected runtime information for the one or more deployed persistent memory devices, and the set of requirements.

\* \* \* \* \*